United States Patent
Lee et al.

(10) Patent No.: US 8,824,814 B2
(45) Date of Patent: Sep. 2, 2014

(54) PIXEL DATA COMPRESSION AND DECOMPRESSION METHOD

(75) Inventors: Te-Wei Lee, Pingzhen (TW); Pai-Chu Hsieh, Hsinchu (TW); Heng-Yao Lin, Tainan (TW)

(73) Assignee: Alpha Imaging Technology Corp., Hsinchu County (TW)

( * ) Notice: Subject to any disclaimer, the term of this patent is extended or adjusted under 35 U.S.C. 154(b) by 197 days.

(21) Appl. No.: 13/424,051

(22) Filed: Mar. 19, 2012

(65) Prior Publication Data

US 2012/0294542 A1 Nov. 22, 2012

(30) Foreign Application Priority Data

May 20, 2011 (TW) .............................. 100117832 A

(51) Int. Cl.
*G06K 9/36* (2006.01)
*H04N 7/26* (2006.01)
*G06K 9/46* (2006.01)

(52) U.S. Cl.
CPC ... *H04N 19/00533* (2013.01); *H04N 19/00484* (2013.01)
USPC ........................................................ 382/233

(58) Field of Classification Search
CPC .. H04N 7/50; H04N 19/00478; G06F 9/3822; G06F 12/0866; G06F 12/0875
USPC .................. 382/232, 233, 246, 305; 348/384; 358/426.02; 708/202; 711/105, 202
See application file for complete search history.

(56) References Cited

U.S. PATENT DOCUMENTS

| | | | | |
|---|---|---|---|---|
| 5,191,548 A | * | 3/1993 | Balkanski et al. | 708/402 |
| 5,920,352 A | * | 7/1999 | Inoue | 348/384.1 |
| 6,779,100 B1 | * | 8/2004 | Keltcher et al. | 711/202 |
| 7,529,412 B2 | * | 5/2009 | Park | 382/232 |
| 2010/0260428 A1 | * | 10/2010 | Ueno et al. | 382/232 |
| 2012/0294542 A1 | * | 11/2012 | Lee et al. | 382/233 |

FOREIGN PATENT DOCUMENTS

TW 200731809 8/2007

OTHER PUBLICATIONS

Xuena Bao et al., "A Lossless Frame Recompression Scheme for Reducing DRAM Power in Video Encoding", 2010IEEE, vol. 978-1-4244-5308, pp. 677-680, May 30-Jun. 2, 2010.

* cited by examiner

*Primary Examiner* — Amir Alavi
(74) *Attorney, Agent, or Firm* — Rabin & Berdo, P.C.

(57) ABSTRACT

A pixel data decompression method for decompressing a frame is provided. The method includes: loading memory storage addresses corresponding to to-be-decompressed blocks; reading and decompressing a pixel line of a current block according to a memory storage address of the current block; updating the memory storage address of the current block according to a decompression result; reading a memory storage address of a next block if decompression of a pixel line of the frame is not completed; and repeating the above steps until decompression of the frame is completed.

12 Claims, 4 Drawing Sheets

PIXEL DATA COMPRESSION AND DECOMPRESSION METHOD

This application claims the benefit of Taiwan application Serial No. 100117832, filed May 20, 2011, the subject matter of which is incorporated herein by reference.

TECHNICAL FIELD

The disclosure relates in general to a pixel data compression/decompression method.

BACKGROUND

In an image decoding and playing system, since many frames are stored for processing and playing images, a large amount of memory space, bandwidth and power consumption are needed for storing and processing the frames. To overcome such problems, many frame compression/decompression technologies are provided.

For most commonly frame compression/decompression technologies, pixels are compressed in block-based but played in raster scan. In the block-based compression, in compressing a frame, the frame is divided into a number of blocks, and each of the blocks is compressed. In the raster scan, when playing a frame, the frame is played from left to right and top to down in pixel line by pixel line.

Conventionally, extra memory is needed for storing decompressed image data to complete the conversion between different modes (that is, from the block-based mode to the raster scan mode). For example, when performing compression, a frame is divided into a number of macroblocks and each macroblock includes 16(pixels)*16(pixels). A macroblock is used as a basic unit in encoding/decoding. If a decompressed frame is played in the raster scan mode, then an extra memory is needed for storing decompressed pixels. By doing so, extra memory, bandwidth and power consumption are used and the benefits of compressing/decompressing jeopardized. Further, another extra memory is needed for storing pixels which are compressed in the raster scan mode, and still another extra memory is needed for storing the decompressed pixels which are read in the raster scan mode. Or, an extra memory is need for storing pixels which are compressed in block-based, and then still another memory is needed for storing the decompressed pixels which are read in the raster scan mode.

Therefore, conventional technologies require extra memory space and memory bandwidth for storing pixel data, and consume extra power in storage and access of pixel data.

BRIEF SUMMARY OF THE DISCLOSURE

The disclosure is directed to a pixel data compression/decompression method, in which storage of the decompressed pixel data does not need extra memory despite pixels are compressed in block-based mode and decompressed in the raster scan mode (post processing such as image rotation may be applied to the decompressed frame).

According to an example of the disclosure, a pixel data compression method for compressing a frame is provided. The method includes: recording a memory storage address for addressing a compressed block of the frame; compressing the block line by line and storing the compressed block according to the memory storage address; repeating the above steps until compression of the frame is completed.

According to another example of the disclosure, a pixel data decompression method for decompressing a frame is provided. The method includes: (a) setting a parameter N; (b) loading a line start array including a plurality of memory address fields corresponding to a plurality of to-be-decompressed blocks of the frame; (c) reading a memory address field of a current block from the line start array; (d) reading and decompressing an $i^{th}$ pixel line of the current block according to the memory address field of the current block, wherein the $i^{th}$ pixel line of the current block includes a portion of an $N^{th}$ pixel line of the frame, and i is 0 or a positive integer; (e) updating the memory address field of the current block of the line start array as a memory storage address of an $(i+p)^{th}$ pixel line of the current block, wherein p is a positive integer; (f) reading a memory address field of a next block from the line start array if compression of the $N^{th}$ pixel line of the frame is not completed; (g) repeating the above steps (d)~(f) until decompression of the $N^{th}$ pixel line of the frame is completed; (h) updating the parameter N; and (i) repeating the above steps (b)~(h) until decompression of the frame is completed.

According to an alternate example of the disclosure, a pixel data compression and decompression method for compressing and decompressing a frame is provided. In compressing the frame, the method includes the following steps: (1a) recording a memory storage address for addressing a compressed block of the frame; (1b) compressing the block line by line and storing the compressed block according to the memory storage address; (1c) repeating the above steps until compression of the frame is completed. In decompressing the frame, the method includes the following steps: (2a) setting a parameter N; (2b) loading a line start array including a plurality of memory address fields corresponding to a plurality of to-be-decompressed blocks of the frame; (2c) reading a memory address field of a current block from the line start array; (2d) reading and decompressing an $i^{th}$ pixel line of the current block according to the memory address field of the current block, wherein the $i^{th}$ pixel line of the current block includes a portion of an $N^{th}$ pixel line of the frame, and i is 0 or a positive integer; (2e) updating the memory address field of the current block of the line start array as a memory storage address of an $(i+p)^{th}$ pixel line of the current block, wherein p is a positive integer; (2f) reading a memory address field of a next block from the line start array if compression of the $N^{th}$ pixel line of the frame is not completed; (2g) repeating the above steps (2d)~(2f) until decompression of the $N^{th}$ pixel line of the frame is completed; (2h) updating the parameter N; and (2i) repeating the above steps (2b)~(2h) until decompression of the frame is completed.

According to yet an alternate example of the disclosure, a pixel data decompression method for decompressing a frame is provided. The method includes: loading a plurality of memory storage addresses corresponding to a plurality of to-be-decompressed blocks of the frame; reading and decompressing a pixel line of a current block according to a memory storage address of a current block; updating the memory storage address of the current block according to a decompression result; reading a memory storage address of a next block if decompression of the pixel line of the frame is not completed; repeating the above steps until decompression of the frame is completed.

It is to be understood that both the foregoing general description and the following detailed description are exemplary and explanatory only and are not restrictive of the disclosed embodiments, as claimed.

DETAILED DESCRIPTION OF THE DISCLOSURE

In one embodiment of the disclosure, a memory storage address of each block is recorded during block-based compression, and the memory storage address of a next to-be-decompressed pixel line of each block is updated during decompression.

Figure 1:
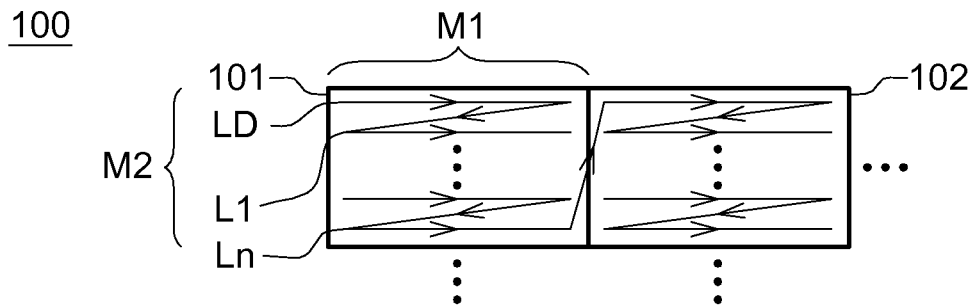
FIG. 1 shows a schematic diagram of block-based compression.

Referring to FIG. 1, a schematic diagram of block-based compression is shown. The frame 100 includes blocks 101, 102 .... As indicated in FIG. 1, in block-based compression, the block 101 is compressed first, and then the block 102 is compressed until all blocks of the frame 100 are compressed so as to complete compression of the frame 100. Exemplarily but not restrictively, a block includes M1*M2 pixel data, wherein M1 and M2 may be any positive integers. In addition, block-based compression is still applicable in the case M2=1. That is, in frame compression, pixels are compressed in the unit of "line", and such practice is still within the spirit of the disclosure.

Figure 2:
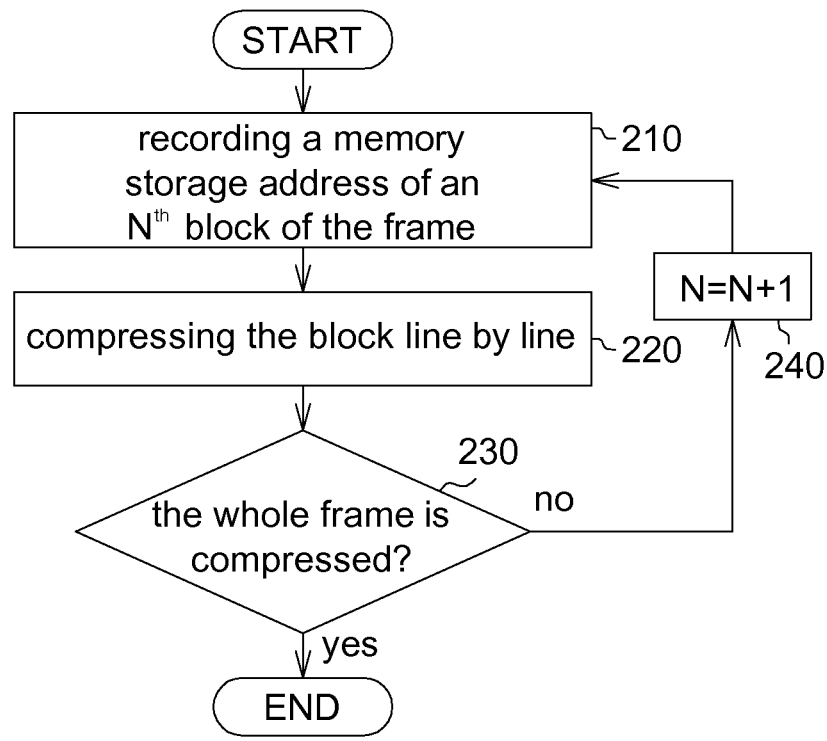
FIG. 2 shows a flowchart of a compression method according to one embodiment of the disclosure.

Referring to FIG. 2, a flowchart of a compression method according to one embodiment of the disclosure is shown. As indicated in step 210 of FIG. 2, a memory storage address for addressing a compressed $N^{th}$ block (an $N^{th}$ block is compressed into the compressed $N^{th}$ block) is assigned/recorded, wherein N is a positive integer. The compressed $N^{th}$ block and the subsequent compressed $(N+1)^{th}$ block may be stored sequentially or non-sequentially. Further, a memory storage address for the compressed $N^{th}$ block refers to a memory storage address for addressing a start pixel data (such as a pixel data at the top left corner) of the compressed $N^{th}$ block. Alternatively, the memory storage address for the compressed $N^{th}$ block refers to a memory storage address for addressing a start pixel data of a pixel line of the compressed $N^{th}$ block. In the present embodiment, the memory storage addresses of all compressed blocks of the frame are stored in a look-up table (referred as a block random access table).

In step 220, the $N^{th}$ block is compressed line by line, and details are given below. The compressed $N^{th}$ block is stored/written into a memory according to the memory storage address assigned/recorded in the step 210. Referring to FIG. 1, when compressing the block 101, data of the $0^{th}$ pixel line L0 are compressed first and data of the first pixel line L1 are compressed next until data of the last pixel line Ln are compressed so as to complete compression of the block 101. Likewise, in compressing the block 102, all pixel lines are compressed line by line. In compressing the pixel line, all pixel data of the pixel line are compressed such as from left to right.

In step 230, whether compression of the frame is completed is determined. That is, whether compression of all blocks of the frame is completed is determined. If yes, then it is determined that compression is completed. If no, then the value of N is added by 1 (N=N+1) so as to compress the next block as indicated in step 240. After step 240 is performed, the method returns to step 210, the above steps are repeated until compression of all blocks of the frame is completed.

Figure 3:
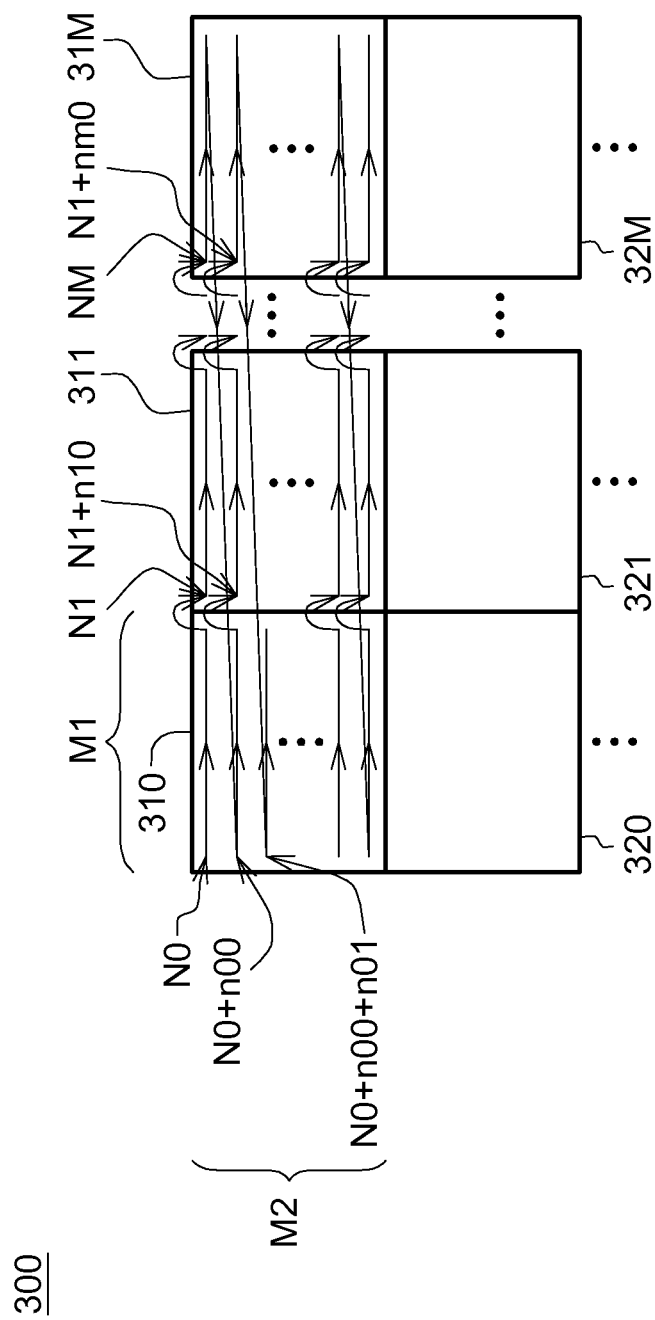
FIG. 3 shows a schematic diagram of decompression according to one embodiment of the disclosure.

How decompression is performed in the present embodiment of the disclosure is disclosed below. Referring to FIG. 3, a schematic diagram of decompression according to one embodiment of the disclosure is shown. In displaying the frame 300 in raster scan mode, the $0^{th}$ pixel line of the frame 300 is displayed first, the first pixel line of the frame is displayed next, and the remaining pixel lines are displayed by the same analogy. The $0^{th}$ pixel line of the frame 300 includes the $0^{th}$ pixel line of the block 310, the $0^{th}$ pixel line of the block 311, ..., and the $0^{th}$ pixel line of the block 31M. Therefore, the sequence in decompressing the $0^{th}$ pixel line of the frame 300 is as follows: decompressing the $0^{th}$ pixel line of the block 310, decompressing the $0^{th}$ pixel line of the block 311, ..., and decompressing the $0^{th}$ pixel line of the block 31M, so as to complete decompression of the $0^{th}$ pixel line of the frame 300. Remaining pixel lines of the frame 300 may be decompressed by the same analogy.

Figure 4:
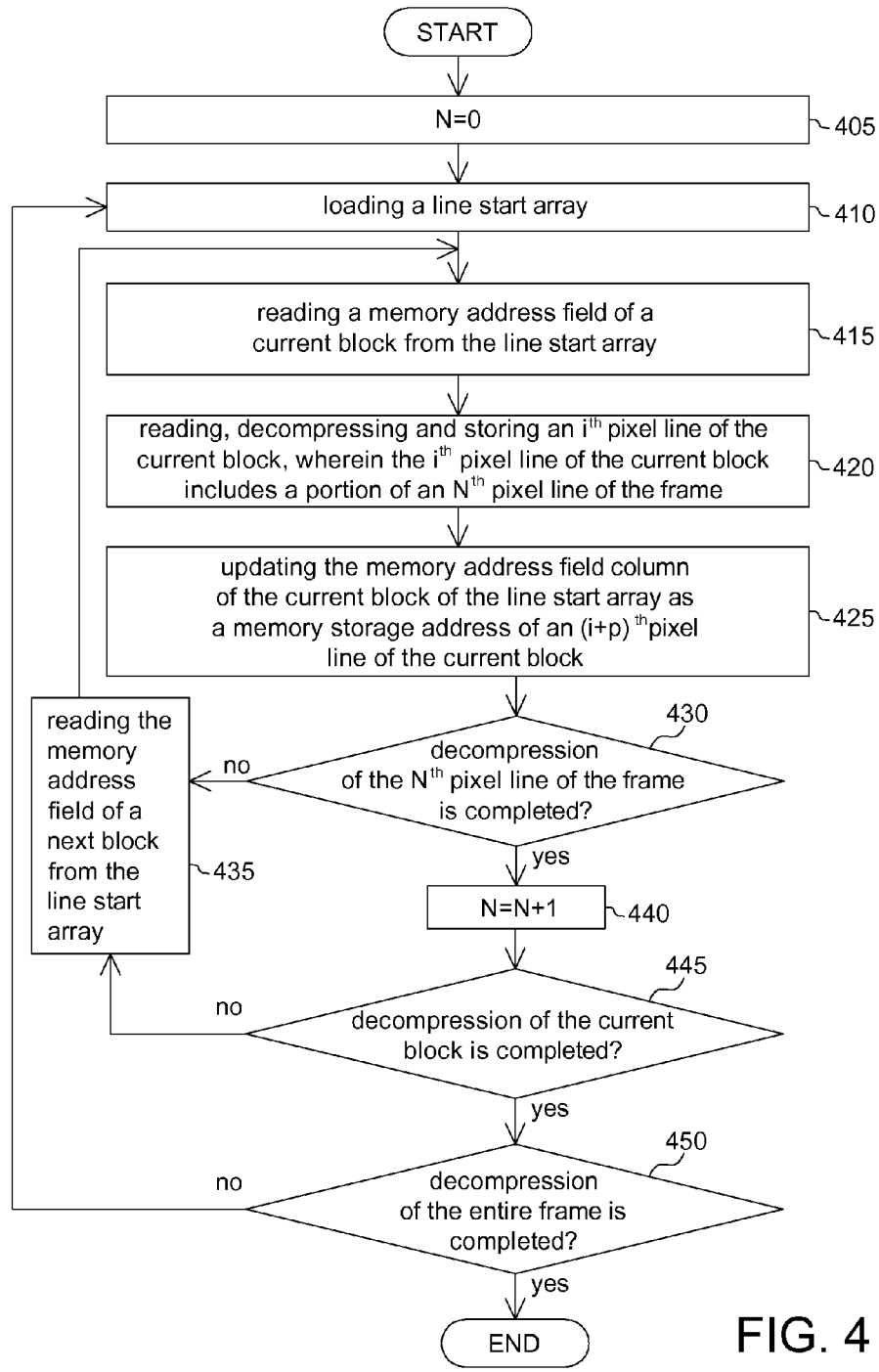
FIG. 4 shows a flowchart of a decompression method according to one embodiment of the disclosure

Referring to FIG. 4, a flowchart of a decompression method according to one embodiment of the disclosure. In step 405, an initial value of the parameter N is set as for example 0, wherein the parameter N denotes the to-be-decompressed $N^{th}$ pixel line of the frame.

Figure 5:
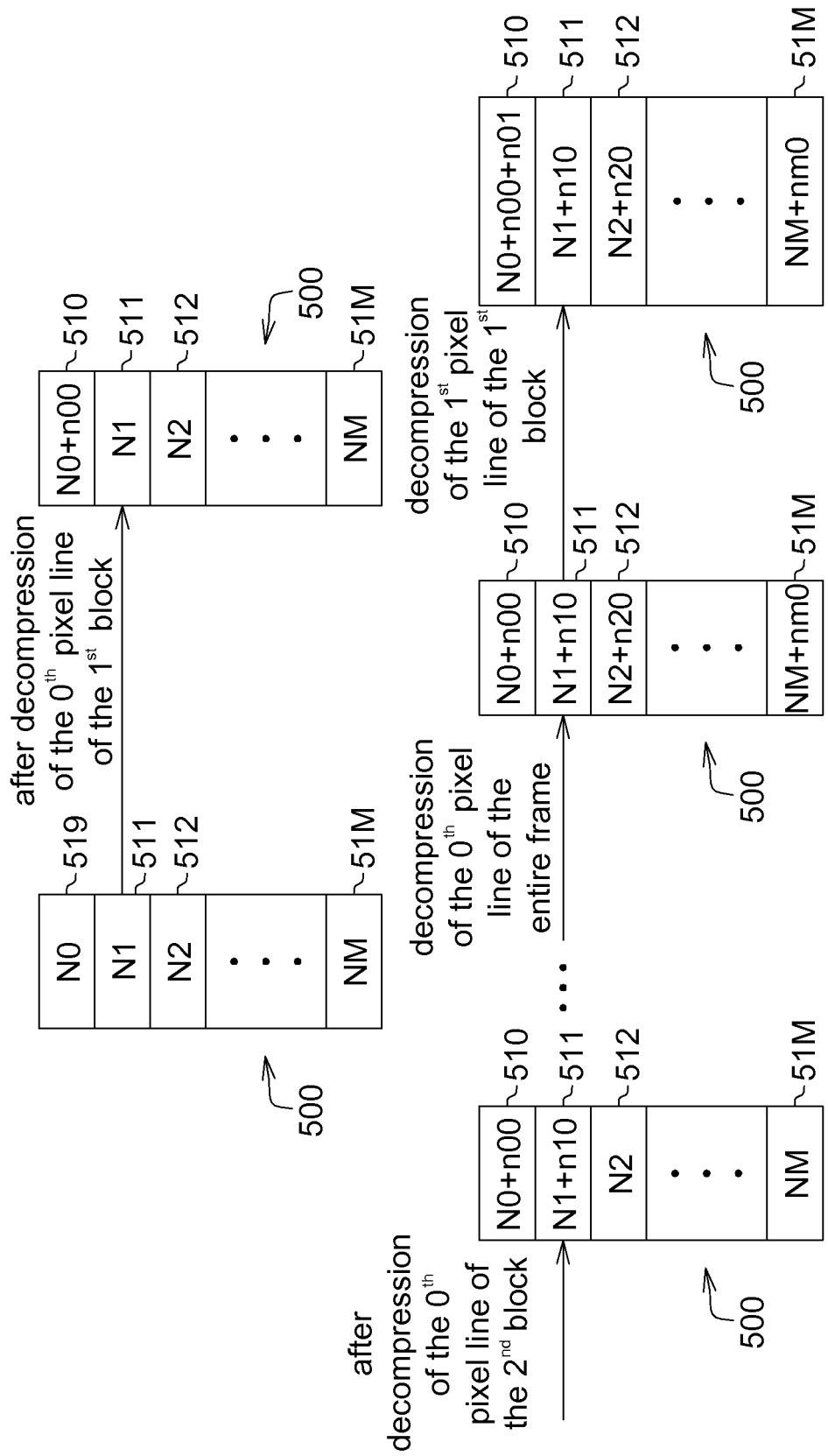
FIG. 5 shows a line start array and its updating according to one embodiment of the disclosure.

In step 410, a line start array is loaded. As indicated in FIG. 5, the line start array 500 includes memory address fields 510~51M for addressing (M+1) to-be-decompressed blocks, wherein M is a positive integer, and (M+1)=(frame width/M1). The (M+1) memory address fields are loaded to the line start array 500 from the block random access table. To put it in greater details as indicated in FIG. 3, in decompressing the $0^{th}$ pixel line of the frame 300, the memory storage addresses of the to-be-decompressed blocks 310~31M are loaded from the block random access table into the (M+1) memory address fields 510~51M of the line start array 500. The to-be-decompressed blocks 310~31M include the pixel data required for decompressing the $0^{th}$ pixel line of the frame 300. Meanwhile, the (M+1) memory address fields 510~51M respectively are N0~NM.

In step 415, the memory address field of the current to-be-decompressed block is read from the line start array 500. For example, the memory address field 510 of the to-be-decompressed block 310 is read from the line start array 500 so as to obtain the memory storage address of the to-be-decompressed block 310 as "N0".

In step 420, an $i^{th}$ pixel line of the current block is read, decompressed and stored, wherein the $i^{th}$ pixel line of the current block includes a portion of the $N^{th}$ pixel line of the frame, and "i" is a positive integer. To put it in greater details, the $i^{th}$ pixel line of the current block is 1/(M+1) of the $N^{th}$ pixel line of the frame. In the above example, M1 pixel data are read, decompressed and stored according to the memory storage address N0. Thus, reading, decompression and storage of the $i^{th}$ pixel line of the current block are completed.

In step 425, the memory address field of the current block of the line start array 500 is updated as a memory storage address of an $(i+p)^{th}$ pixel line of the current block, wherein p is a positive integer, and for convenience of elaboration, p=1 for exemplification purpose. In the above example, since decompression of the $0^{th}$ pixel line of the block 310 is completed, the memory address field of the block 310 of the line start array 500 is updated as a memory storage address N0+n00 of the $1^{st}$ pixel line of the block 310 as indicated in FIG. 3 and FIG. 5. Before decompression of the $0^{th}$ pixel line of the block 310, the value of n00 is unknown. After the $0^{th}$ pixel line of the block 310 is decompressed, the memory storage address of the last pixel data of the $0^{th}$ pixel line of the block 310 is obtained. Since the block 310 is compressed line by line, in terms of compression sequence, the last pixel data of the $0^{th}$ pixel line of the block 310 is compressed before the first pixel data of the first pixel line of the block 310. That is, in the memory, the memory storage address of the last pixel data of the $0^{th}$ pixel line of the block 310 is followed by the memory storage address of the first pixel data of the first pixel line of the block 310. Therefore, the memory storage address of the first pixel data of the first pixel line of the block 310 may be known from the memory storage address of the last pixel data of the $0^{th}$ pixel line of the block 310.

In step 430, whether decompression of the $N^{th}$ pixel line of the frame is completed is determined. If yes, the process proceeds to step 440, otherwise, the process proceeds to step 435.

If decompression of the $N^{th}$ pixel line of the frame is not completed, then the $i^{th}$ pixel line of a next block is decompressed. In step 435, the memory address field of the next block is read from the line start array 500.

In the above examples, the $0^{th}$ pixel line of the block 311 is decompressed after decompression of the $0^{th}$ pixel line of the block 310 is completed. Therefore, the next memory address field "N1" of the block 311 is read from the line start array 500. After decompression of the $0^{th}$ pixel line of the block 311 is completed, steps 420 and 425 are repeated and the memory address field of the block 311 of the line start array 500 is updated as the memory storage address "N1+n10" of the $1^{st}$ pixel line of the block 311 as indicated in FIG. 3 and FIG. 5.

Steps 420 and 425 are repeated until decompression of the $N^{th}$ pixel line of the frame is completed. That is, if the $0^{th}$ pixel line of the block 31M is compressed, then decompression of the $0^{th}$ pixel line of the frame is completed. Thus, after the $0^{th}$ pixel line of the frame is decompressed, the (M+1) memory address fields of the line start array 500 are updated as (N0+n00)~(NM+nm0).

After the $N^{th}$ pixel line of the frame is decompressed, in step 440, the value of N is added by 1, that is, N=N+1, and this indicates the next pixel line of the frame will be decompressed. As indicated in FIG. 3 and FIG. 5, if decompression of the first pixel line of the block 310 is completed, then the memory address field of the block 310 of the line start array 500 is updated as the memory storage address (N0+n00+n01) of the second pixel line of the block 310.

In step 445, whether decompression of the current block is completed is determined. That is, whether decompression of the block 31M is completed is determined. If decompression of the block 31M is completed, this indicates that previous blocks 310~31(M−1) are all decompressed. If decompression of the block 31M is not completed, then the process proceeds to step 435. In the above example, the above steps are repeated until decompression of the (M2−1)$^{th}$ pixel line of the frame 300 is completed, and this indicates that the (M+1) blocks 310~31M are all decompressed. Thus, in step 450, whether decompression of the entire frame is completed is determined. If no, then the process proceeds to step 410, the line start array is loaded again. In the above example, if decompression of the blocks 310~31M is completed, then in step 410, the memory address fields of the blocks 320~32M are loaded to the line start array 500 from the block random access table. The above steps are repeated until decompression of the entire frame is completed.

As indicated in the above disclosure, the pixel data compression/decompression method of the present embodiment of the disclosure does not require extra memory for storing the decompressed pixel data despite the frame is compressed in block-based and displayed in raster scan, hence reducing the required memory space, memory bandwidth and power consumption.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A pixel data decompression method, applicable to an image processing device, for decompressing a frame, the pixel data decompression method comprising:
   (a) setting a parameter N;
   (b) loading a line start array comprising a plurality of memory address fields corresponding to a plurality of to-be-decompressed blocks of the frame;
   (c) reading a memory address field of a current block from the line start array;
   (d) reading and decompressing an $i^{th}$ pixel line of the current block according to the memory address field of the current block, wherein the $i^{th}$ pixel line of the current block comprises a portion of an $N^{th}$ pixel line of the frame, and i is 0 or a positive integer;
   (e) updating the memory address field of the current block of the line start array as a memory storage address of an $(i+p)^{th}$ pixel line of the current block, wherein p is a positive integer;
   (f) reading a memory address field of a next block from the line start array if compression of the $N^{th}$ pixel line of the frame is not completed;
   (g) repeating the above steps (d)~(f) until decompression of the $N^{th}$ pixel line of the frame is completed;
   (h) updating the parameter N; and
   (i) repeating the above steps (b)~(h) until decompression of the frame is completed.

2. The method according to claim 1, wherein, the step (a) comprises:
   setting an initial value of the parameter N.

3. The method according to claim 1, wherein, the step (b) comprises:
   loading a plurality of memory storage address corresponding to the blocks to the line start array from a block random access table.

4. The method according to claim 3, wherein, the memory storage address corresponding to the to-be-decompressed block is a memory storage address for addressing a starting pixel data of the to-be-decompressed block.

5. The method according to claim 1, wherein, the memory storage address of the $(i+p)^{th}$ pixel line of the current block is obtained after the $i^{th}$ pixel line of the current block is decompressed.

6. A pixel data compression and decompression method, applicable to an image processing device, for compressing and decompressing a frame, the pixel data compression and decompression method comprising:
   in compressing the frame, performing the following steps:
   (1a) recording a memory storage address for addressing a compressed block of the frame;
   (1b) compressing the block line by line and storing the compressed block according to the memory storage address; and
   (1c) repeating the above steps until compression of the frame is completed; and
   in decompressing the frame, performing the following steps:
   (2a) setting a parameter N;
   (2b) loading a line start array comprising a plurality of memory address fields corresponding to a plurality of to-be-decompressed blocks of the frame;
   (2c) reading a memory address field of a current block from the line start array;

(2d) reading and decompressing an $i^{th}$ pixel line of the current block according to the memory address field of the current block, wherein the $i^{th}$ pixel line of the current block comprises a portion of an $N^{th}$ pixel line of the frame, and i is 0 or a positive integer;

(2e) updating the memory address field of the current block of the line start array as a memory storage address of an $(i+p)^{th}$ pixel line of the current block, wherein p is a positive integer;

(2f) reading a memory address field of a next block from the line start array if compression of the $N^{th}$ pixel line of the frame is not completed;

(2g) repeating the above steps (2d)~(2f) until decompression of the $N^{th}$ pixel line of the frame is completed;

(2h) updating the parameter N; and (2i) repeating the above steps (2b)~(2h) until decompression of the frame is completed.

7. The method according to claim 6, wherein, the step (1a) comprises:

recording a memory storage address for addressing a starting pixel data of the compressed block as the memory storage address of the block.

8. The method according to claim 6, wherein, the step (1b) comprises:

compressing a current pixel line; and compressing a next pixel line until a last pixel line is compressed.

9. The method according to claim 6, wherein, the step (2a) comprises:

setting an initial value of the parameter N.

10. The method according to claim 6, wherein, the step (2b) comprises:

loading a plurality of memory storage addresses corresponding to the blocks to the line start array from a block random access table.

11. The method according to claim 10, wherein, in the step (2b), the memory storage address corresponding to the to-be-decompressed block is a memory storage address for addressing a starting pixel data of the to-be-decompressed block.

12. The method according to claim 6, wherein, the memory storage address of the $(i+p)^{th}$ pixel line of the current block is obtained after the $i^{th}$ pixel line of the current block is decompressed.

* * * * *